(12) United States Patent
Leath, III

(10) Patent No.: US 8,496,117 B2
(45) Date of Patent: Jul. 30, 2013

(54) SELF CLEANING, CONTINUOUSLY OPERATING FILTER APPARATUS FOR FLUIDS

(76) Inventor: William M. Leath, III, Seattle, WA (US)

(*) Notice: Subject to any disclaimer, the term of this patent is extended or adjusted under 35 U.S.C. 154(b) by 0 days.

(21) Appl. No.: 13/287,854

(22) Filed: Nov. 2, 2011

(65) Prior Publication Data

US 2012/0111788 A1   May 10, 2012

Related U.S. Application Data

(63) Continuation of application No. 11/515,235, filed on Sep. 1, 2006, now abandoned.

(51) Int. Cl.
*B01D 33/067* (2006.01)
*B01D 33/11* (2006.01)
*B01D 33/50* (2006.01)

(52) U.S. Cl.
USPC ........ 210/373; 210/360.1; 210/393; 210/394; 210/396; 210/397; 210/403; 210/499

(58) Field of Classification Search
USPC ................. 210/373, 392, 393, 394, 396, 397, 210/403, 499, 360.1
See application file for complete search history.

(56) References Cited

U.S. PATENT DOCUMENTS

| | | | | |
|---|---|---|---|---|
| 1,950,466 A | * | 3/1934 | Wille et al. | 210/392 |
| 2,310,587 A | * | 2/1943 | MacNeill | 210/411 |
| 3,074,556 A | * | 1/1963 | Rosaen | 210/195.1 |
| 3,168,467 A | * | 2/1965 | Dreyer | 210/108 |
| 3,574,509 A | * | 4/1971 | Zentis et al. | 210/107 |
| 3,635,348 A | * | 1/1972 | Carr | 210/333.1 |
| 5,587,074 A | * | 12/1996 | Lynch et al. | 210/411 |
| 5,824,229 A | * | 10/1998 | Larkey et al. | 210/741 |
| 6,267,879 B1 | * | 7/2001 | Gil | 210/107 |
| 2008/0053889 A1 | * | 3/2008 | Leath | 210/403 |

FOREIGN PATENT DOCUMENTS

NL    57708    * 8/1945

* cited by examiner

*Primary Examiner* — Thomas M Lithgow
(74) *Attorney, Agent, or Firm* — Jensen & Puntigam, P.S.

(57) ABSTRACT

The filter apparatus for an incoming liquid which includes a retentate and a permeate includes a housing with a frame and a hollow drum assembly mounted for rotation within the housing. An inlet assembly delivers the incoming liquid under pressure to the drum assembly. A filter assembly is mounted to the inside of the drum. A trough assembly is mounted so as to be in a fluid-tight relationship to the interior surface of the filter assembly as the drum rotates past the trough assembly. A manifold is fixedly mounted and configured to cover successive columns of openings of the drum wall as the drum rotates. Pressurized gas is directed to the manifold, so that as the drum turns, and retentate is collected on the interior surface of the filter, pressurized fluid from the manifold dislodges the retentate into the trough and out an outlet assembly.

19 Claims, 6 Drawing Sheets

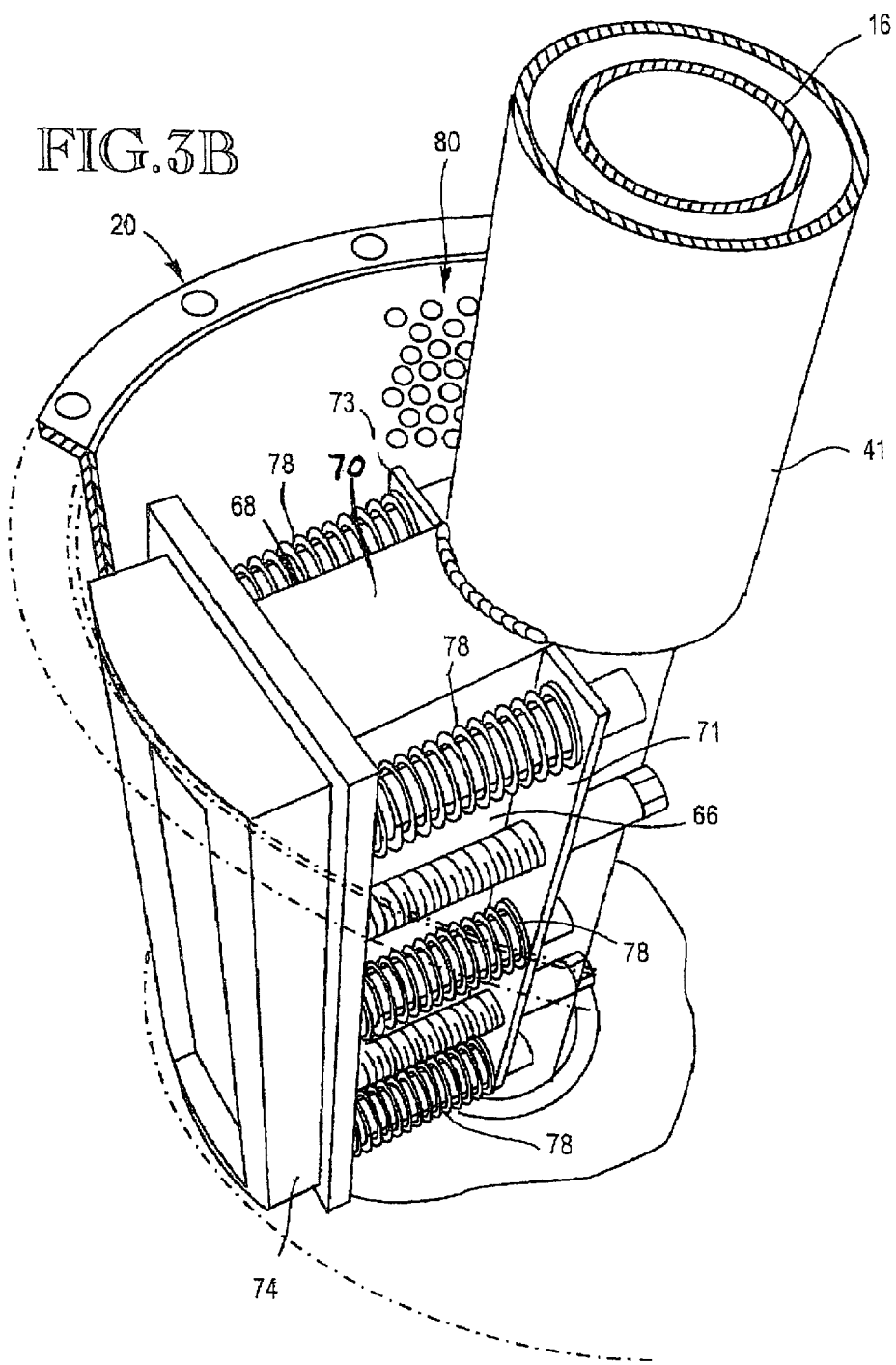

SELF CLEANING, CONTINUOUSLY OPERATING FILTER APPARATUS FOR FLUIDS

PRIOR APPLICATION

This is a continuation application of U.S. patent application Ser. No. 11/515,235 filed on Sep. 1, 2006.

TECHNICAL FIELD

This invention relates generally to fluid filtering apparatus which separates a retentate portion of an incoming fluid from the remaining permeate portion thereof, and more specifically concerns such a system which includes a back-flush portion for removing the retentate from a filter portion of the apparatus.

BACKGROUND OF THE INVENTION

In general, it is considered desirable, because of a number of considerations, to filter out pollutants or other material from waste water or other liquids, thereby preserving the filtered liquid for re-use. While generally the purpose of such filtering is to save the permeate (the liquid), sometimes filtering is used to obtain the retentate, i.e. the material captured by the filter from the incoming liquid. This can also be true for fluids other than liquids.

Filtering issues and concerns are present in a number of industries, among them the laundry industry, in which it is important to reclaim as much water as possible. Commercial laundries often face high costs of disposing of waste water as well as the cost of new water. One significant issue in reclamation of laundry waste water is the presence of lint in the unprocessed wastewater.

Membrane-type filters have been shown to be not particularly effective in dealing with lint, since they shortly become clogged and are difficult to clean. Another filtering device which is considered for use in filtering applications is the rotary drum filter. Rotary drums are limited to low/no pressure operation and thus cannot remove small particulates or other pollutants. Further, drum filters typically are large and require considerable space, which in many applications is undesirable.

Still other systems, including rotary pressure filters, are often quite complicated and as a result, expensive. They also can be unreliable, particularly with respect to certain material, such as lint.

Hence, it would be desirable to have an effective filter system, specifically, one designed and arranged to have not only a long life, but which provides consistent, highly efficient removal of selected retentates, including in particular lint, for the laundry industry. It is also desirable that such a filter system be a continuous operation, as opposed to a batch operation, and further, be self-cleaning.

SUMMARY OF THE INVENTION

Accordingly, the present invention is a filter apparatus for an incoming fluid having a retentate and a permeate, comprising: a support frame; a container assembly for incoming fluid mounted for rotation by the support frame and having openings therethrough; an inlet assembly for delivering the incoming fluid to the container assembly; a filter assembly mounted to or part of the inside of a portion of the container assembly; an outlet assembly; a trough assembly mounted in fluid communication with the outlet assembly and having a sealing surface contacting an interior surface of the filter assembly; a manifold having a sealing edge for contacting an exterior surface of the container assembly; and a source of pressurized fluid connected to the manifold, wherein, as the container assembly turns in operation, retentate is collected on the interior surface of the filter as the permeate moves through the filter and container assembly and out of the apparatus, the collected retentate being dislodged from the filter, moving into the trough assembly and from there into the outlet assembly by periodic bursts of pressurized fluid.

BRIEF DESCRIPTION OF THE DRAWINGS

FIGS. 3A and 3B are perspective views of the internal structure of a drum portion of the system of FIG. 1.

BEST MODE FOR CARRYING OUT THE INVENTION

Figure 1:
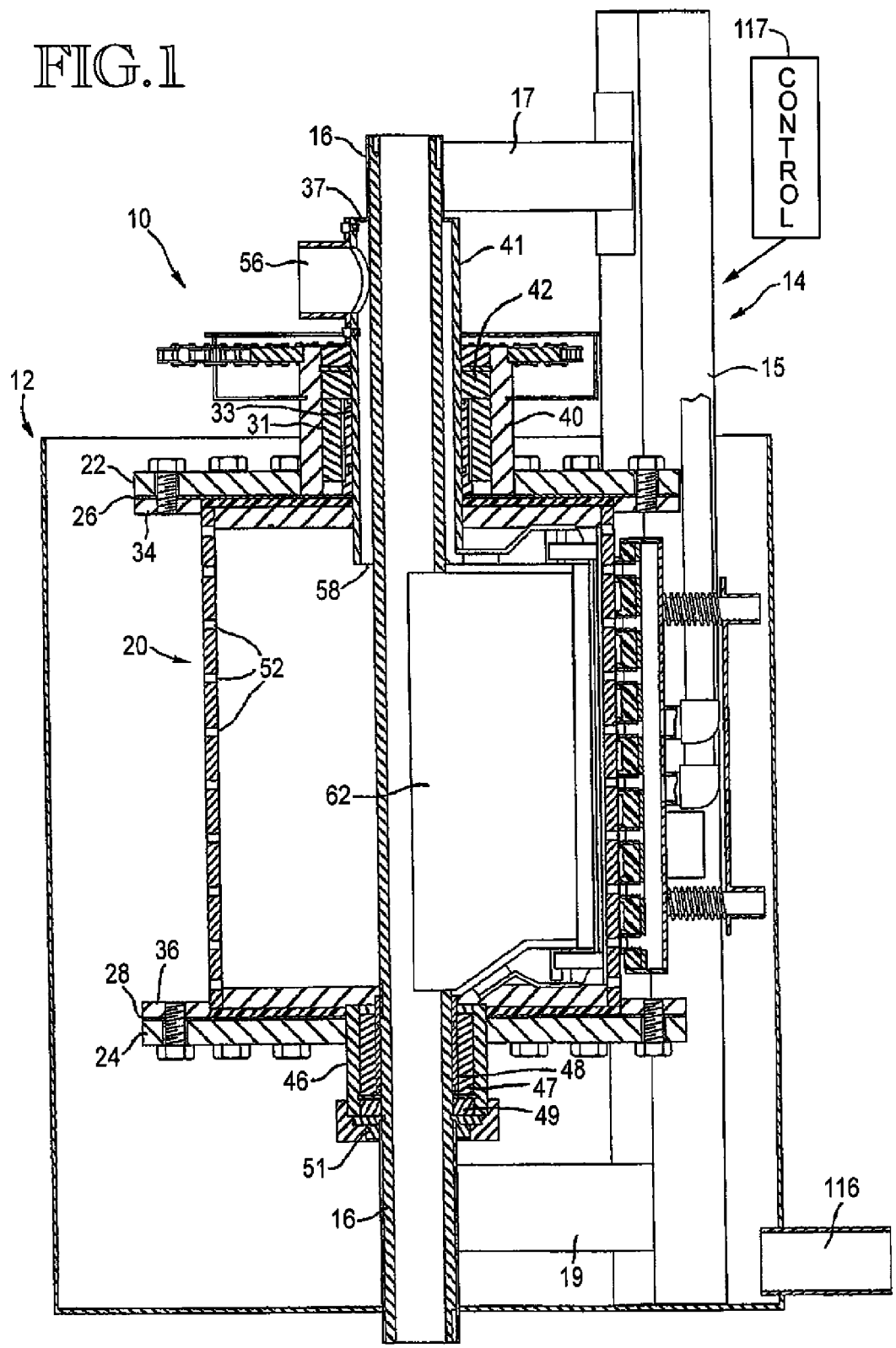
FIG. 1 is a general environmental view of the system disclosed herein.

FIG. 1 shows an overall environmental view of the filter apparatus 10 disclosed herein. The apparatus 10 is used to separate selected elements from an incoming untreated liquid or other fluid. The description herein will focus on a liquid application. In some cases, the separated elements (the retentate) are retained and the treated liquid (permeate) disposed of, while in other cases, the retentate is disposed of and the liquid is retained, typically for re-use. The present apparatus can be used in a variety of industries and applications; however, the description herein, which should not be considered limiting, is directed toward a laundry application, in which a particular retentate, lint, is filtered (removed) efficiently from laundry waste water, permitting re-use of the waste water, following additional conventional steps to remove other elements/pollutants which would otherwise prevent re-use.

The apparatus 10 shown and described includes a housing, generally identified at 12, although a housing is not essential to the system. In the embodiment shown, housing 12 is a cylinder approximately 22 inches in diameter and 26½ inches high. The size of the housing can be varied or eliminated, as indicated above. A metal frame assembly 14 is located within the housing for structural support of the apparatus. Mounted to the frame assembly 14 is a central hollow cylinder 16 which extends from the top of the apparatus, above the top of the housing, to the bottom of the apparatus, extending through the bottom of the housing if a housing is present.

The frame assembly 14 includes a vertical frame element 15 and two horizontal braces 17 and 19, which extend to and are secured to the top and bottom ends of central cylinder 16. The central cylinder 16, the frame assembly and the housing are all fixed in position and remain stationary during operation of the apparatus.

A stainless steel drum 20, with top and bottom drum end plates 22 and 24, is mounted for rotation about cylinder 16. Drum 20 is rotated in operation of the apparatus about central cylinder 16 by a motor and chain drive assembly 30 located above upper end plate 22. In the embodiment shown, drum 20 is approximately 16 inches long by 12 inches in diameter, with a drum wall approximately 5/16-inch thick. At each end of the drum are flanges 34 and 36 which extend outwardly approximately two inches from the remainder of the drum and are attached, respectively, to end plates 22 and 24. Positioned between end plates 22 and 24, respectively, and flange portions 34 and 36, respectively, are gaskets 26 and 28.

Figure 2A:
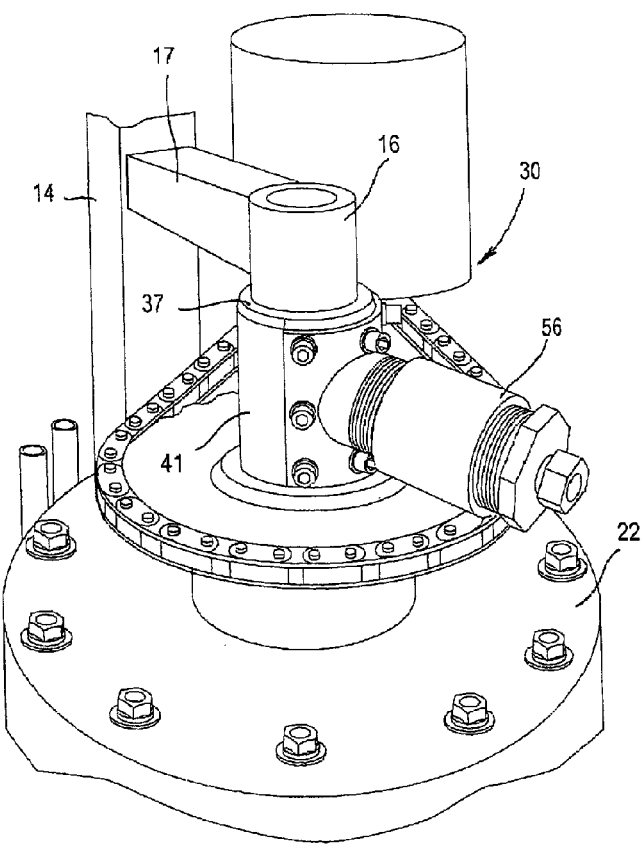
FIGS. 2A and 2B are views showing end portions of the system of FIG. 1.

Top end plate 22 (FIG. 2A) in the embodiment shown is approximately 3/4 inch thick and includes a short cylindrical section 40, with an outside diameter of approximately six inches, located at the center of end plate 22, and extending upwardly from end plate 22, providing an opening into the drum. There is a fluid-tight seal 31 and an adjacent sleeve 33 between cylindrical section 40 and an entry cylinder 41 which is located between central cylinder 16 and cylindrical section 40, as well as a bearing 42 which allows drum 20 to rotate freely and substantially fluid-tight about central cylinder 16. There also a stainless steel member 37 which is welded between entry cylinder 41 and central cylinder 16 at the upper end thereof, closing the space between them and fixing the two cylinders relative to each other.

Figure 2B:
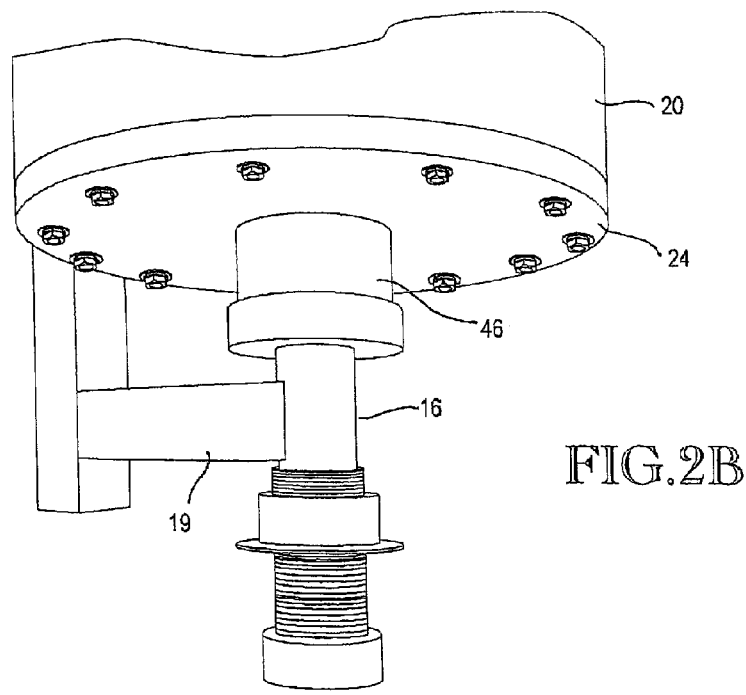

The bottom end plate 24 (FIG. 2B) is also approximately 3/4-inch thick and includes a short cylindrical section 46 having an outside diameter of approximately 4½ inches extending from the center thereof. The cylindrical section 46 opens into the interior of the drum. A substantially fluid-tight seal 47 and sleeve 48 are located between the cylindrical section 46 and central cylinder 16, as well as a bearing 49, which allows the drum to rotate about the cylinder 16. The bearing 49 holds up end plate 24; the bearing 49 is held in place vertically by a snap ring 53 relative to cylindrical section 46 and rotationally by an interference fit with cylindrical section 46. Lower brace portion 19 supports the bearing by another snap ring 51.

Positioned in the wall of drum 20 are a plurality of openings 52 52. In the embodiment shown, openings are spaced in a plurality of rows which extend around the periphery of the drum. With a drum 16 inches long, there are eight rows of openings, although this can vary. The openings are approximately 1/4 inch in diameter. There are approximately 12 openings in each row, equally spaced, such that there are 12 columns of openings around the drum. A different arrangement of openings can of course be used.

The liquid to be filtered enters the drum via an inlet pipe 56 which opens into inlet cylinder 41, which extends a short distance (approximately 1-2 inch) into the interior of the drum. The incoming fluid moves down between the inlet cylinder 41 and the central cylinder 16 into the interior of the drum through circumferential space 58.

Figure 3A:
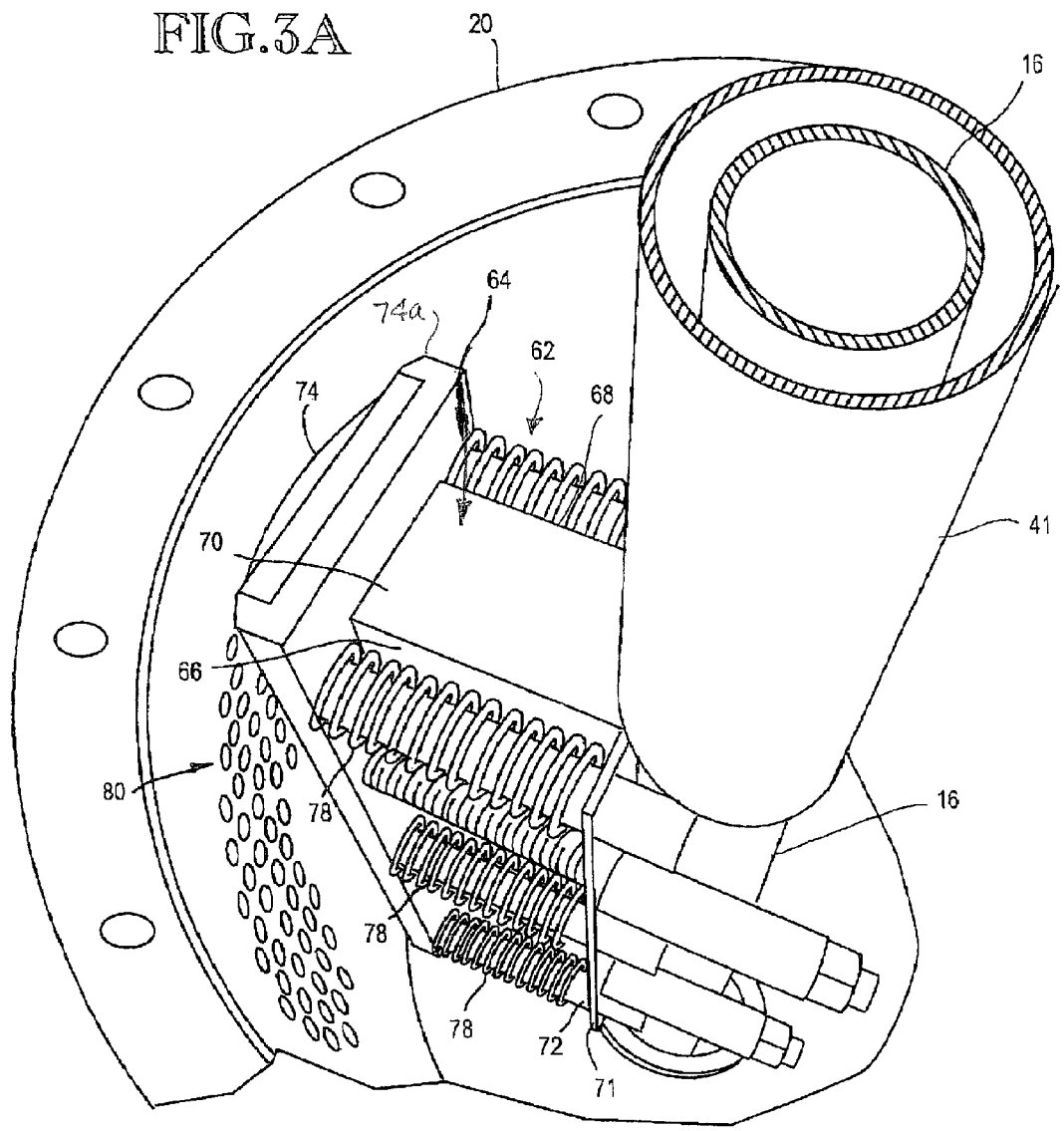
Figure 4:
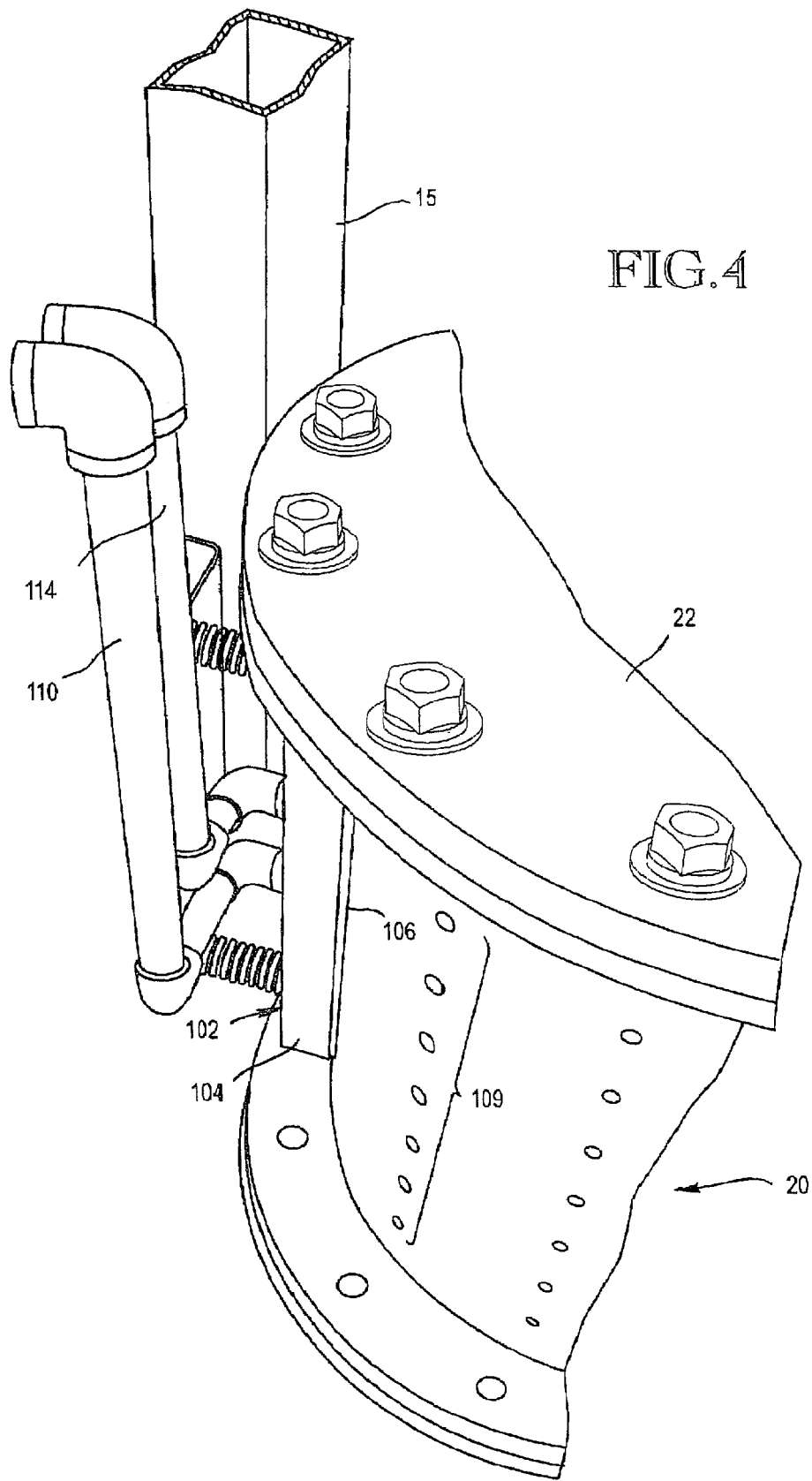
FIG. 4 is a perspective view showing another portion of the system of FIG. 1.

Mounted to central cylinder 16 in the interior of the drum is a trough assembly 62 (FIGS. 3A and 3B in detail). The trough assembly includes a box-like member 64 which, in the embodiment shown, includes flat side elements 66 and 68 which extend approximately/substantially the length of the interior of the drum (approximately one inch short of the ends of the drum in the embodiment shown), the inner edges thereof being welded to the central cylinder 16. The box member 64 also includes end elements 70 and 72 which are welded to the side elements 66 and 68 and also to the cylinder 16. The central cylinder 16 is open over the area defined by the side elements and the end elements, such that any material which enters into the box member 64 can move into hollow central cylinder 16.

Positioned around the upper edge of the box member 64 is a seal member 74. In the embodiment shown, the seal is rubber, such as silicone. The seal member is mounted in a seal support member 74a at the top edge of the box member, such that the seal is movable outwardly, toward the interior surface of the drum. The seal 74 is biased in the outward direction, against a filter assembly 80, which is partially shown in FIG. 3A, and which is positioned against the full length of the interior surface of the drum 20 by a set of springs 78 78. The springs are mounted on two opposing flange members 71, 73 which extend outwardly from the base of the side elements 66 and 68. In operation, springs 78 78 provide a continuing pressure for the seal 74 toward the inside surface of the drum. The seal 74 provides a sealing function between the box member 64 and the filter assembly 80.

Figure 5:
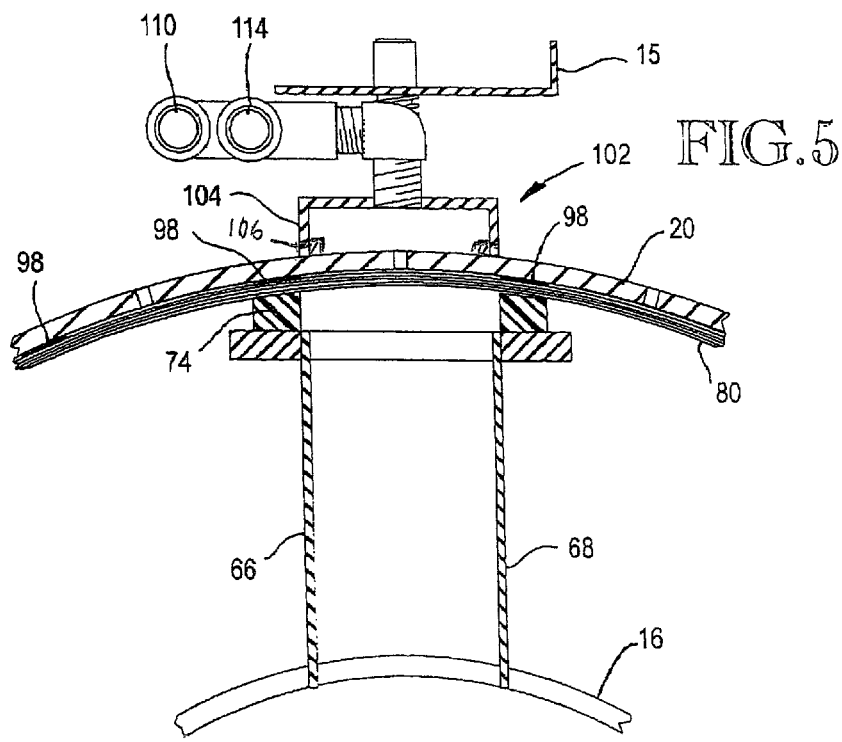
FIG. 5 is a cross-sectional view of the drum portion of the system.
Figure 6:
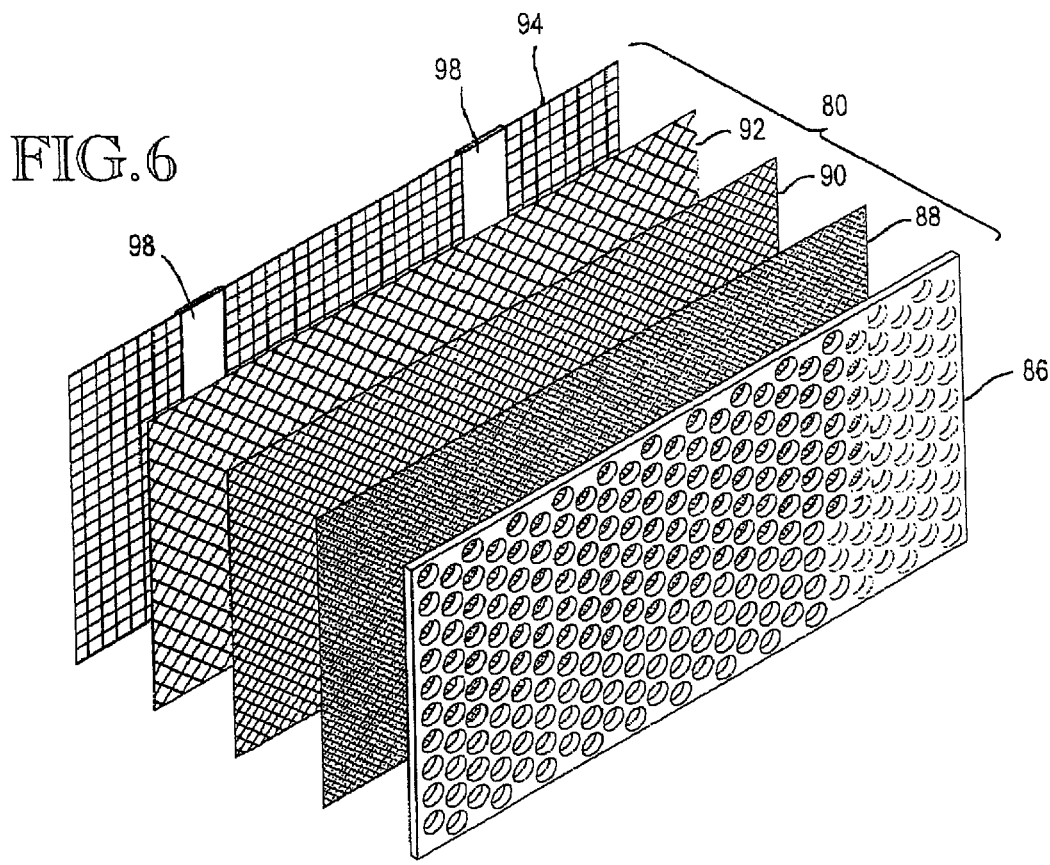
FIG. 6 is a cross-section of the structure of FIG. 1 which accomplishes the separation of the retentate from the permeate.

Mounted to the inside surface of the drum is the filter assembly 80 (FIGS. 5 and 6). The filter assembly in the embodiment shown is approximately 0.125 0.175 inch thick and comprises five layers. The first layer 86 is a sheet of perforated stainless steel. The sheet 86 is approximately 1/16-inch thick and the openings are approximately 1/4 inch in diameter. This layer provides structural support for the other layers and is the surface against which the trough seal member 74 presses. The stainless steel sheet layer is important to the function of the apparatus, as it keeps seal member 74 of the trough assembly from wearing away the active filter layer, which is positioned adjacent to the stainless steel sheet, as the drum and the filter rotate past the seal member in operation.

The active filter layer 88 is a 2-micron fine mesh which acts as the primary filter element. The mesh in this layer in the embodiment shown is 325 wires by 2300 wires per inch. Following the fine mesh layer is a coarse mesh layer 90 that supports the active layer 88. Layer 90, in the embodiment shown, is approximately 100 wires by 100 wires per inch.

Adjacent the first coarse layer 90 is a first extra coarse mesh layer 92, approximately 10 wires by 10 wires per inch, which in conjunction with the next layer 94 provides space between the drum interior surface and the active layer for fluid communication between the active layer and the openings in the drum, as fluid in the drum is forced outwardly through the filter during operation of the apparatus. The next layer is a second extra coarse layer 94 which is adjacent the first extra coarse layer 92, with the mesh arranged at a 45° angle to the first extra coarse layer. The filter 80 can be mounted to the interior of the drum or it could be an integral part of the drum.

Positioned adjacent the second extra coarse layer 94, against the drum interior surface, are strips of rubber gasket material 98 98 which extend along the length of filter layer 94 at spaced intervals. The rubber material is embedded in the mesh layers, including the active mesh layer, so as to seal the space between steel sheet layer 86 and the inner surface of the drum. Rubber gasket strips are also provided in the vicinity of each end of the filter, around the periphery of the filter.

Mounted to the frame of the assembly and hence fixed in position in the apparatus is a metal (usually stainless steel) back-flush manifold 102. The back-flush manifold is a box-like member 104, which includes a seal 106 around its open edge. The manifold 102 extends for substantially the length of drum 20, between the end portions thereof. The distance between the two opposing longitudinal sides of the manifold is sufficient to cover one column of openings between two successive rubber gasket strips, when those two strips come into registry with the side portions of seal member 74. In the embodiment shown, the distance between the two longitudinal sides of the manifold is the same as the distance between two successive rubber gasket strips 98 on the filter. A column 109 of drum openings between the two successive rubber gasket strips will thus be positioned between the sealing side edges of the manifold 102 when the drum 20 is in a position relative to the manifold that its longitudinal edges are in registry with the successive rubber gasket strips. Fluid access to the manifold is provided by pipes 110 and 114 which can be for compressed air, water or steam, or any other fluid, all of which are under pressure.

In operation of the embodiment shown, a pump moves waste water through inlet pipe 56 into drum 20 under pressure. A pressure in the range of 10-20 psi is suitable for a laundry application. In other applications, the pressure can vary from 0 100 psi and even higher, depending upon the particular application. The pressure forces the liquid in the drum outwardly through the filter and then through the openings in drum 20 into the volume between drum 20 and the housing 12. The filtered liquid (permeate) then moves through an exit pipe 116 at the bottom of the housing. The volume defined by the trough member, being sealed, is kept substantially free of liquid and is a depressurized volume since it is not subject to the pressure created by the pump in the remaining volume of the drum. The volume within the trough member is referred to as a back flush zone, as described below.

The drum is rotated by the motor 30 at a rate which is controlled by the system computer/controller 117 which has a stored control program for the system. The controller will typically be located apart from the apparatus, connected to the apparatus by any known communication means.

As the drum rotates at a controlled rate (1-25 RPM) so that when successive pairs of longitudinal rubber gasket strips come into registry with the seals on the longitudinal (side) edges of the trough positioned against the interior of the drum, compressed air is blown into the manifold and hence back through the filter, into the trough volume, creating a "back flush" of the filter. This results in lint which has accumulated on the active filter layer being blown off into the trough assembly and then into the central cylinder 16, from where it falls into a collection bin.

At regular intervals, e.g. every four revolutions, the air pulse may be replaced by a steam pulse for one full revolution of the drum, such that the entire drum is processed, in order to get the filter extra clean by removing any lint or other material which can withstand the air pulses. Alternatively, water or other fluids or water pressurized with air can be used.

Hence, the lint which collects on the active filter layer 88 and the stainless steel layer 86 of the filter by the filtering process is cleaned off by the manifold back flushing action described above into the trough assembly, from where it moves into the central cylinder 16 and then drops out of the apparatus. The controller 117 controls the rate at which the power motor turns, the selection of the fluid for back-flushing, if more than one fluid is available, and the emergency shut-off of the pump.

The flow of the liquid is from inside the drum to the outside of the drum, with a depressurized (no pressure) back flush area being created by the trough assembly and the trough seal. The remainder of the interior volume of the drum is pressurized, as discussed above. The filter assembly combines a rugged sealing surface (stainless steel) and an active filter layer, such that an adequate seal between the trough and the filter can be achieved over a long period of time without wearing down the active filter. The pressurized back-flush manifold provides an opportunity for back-flushing using a variety of pressurized sources.

As indicated above, the filter assembly may be varied, using other materials, such as ceramics, and other configurations while maintaining the overall basic concept of the invention. For instance, a ceramic or other layer can provide a protective/sealing layer for an active filter layer. The filter need not have the active filter/coarse filter arrangement discussed above. Further, what is referred to as the drum assembly in the embodiment shown could be other configurations than as shown, as long as there is a container for the incoming liquid and a surface within the container that includes the filter, which the trough can seal against.

The overall assembly is quite useful in the laundry industry for removing lint, it is, however, as pointed out above, useful in other applications, both where the retentate (the filtered material) is the desired product of the system or where the permeate is the desired product of the system, or in some cases, both.

Although a preferred embodiment of the invention has been disclosed for purposes of illustration, it should be understood that various changes, modifications and substitutions may be incorporated in the embodiment without departing from the spirit of the invention which is defined by the claims which follow.

What is claimed is:

1. A filter apparatus for an incoming fluid having a retentate and a permeate, comprising:
    a support frame;
    a container assembly for incoming fluid mounted for rotation about a mounting member portion of the support frame, the container assembly having openings therethrough;
    wherein the container assembly is a drum assembly, wherein the drum assembly includes two opposing end portions and an intermediate portion, wherein the intermediate portion includes a plurality of openings; and wherein the mounting member portion includes a central cylinder which extends through the container assembly and around which the drum rotates;
    an inlet assembly for delivering the incoming fluid under pressure to the container assembly, wherein the inlet assembly includes an inlet cylinder which surrounds and is slightly larger than the central cylinder, wherein the inlet cylinder extends through one end portion of the drum assembly, the inlet assembly further including a connecting line for receiving incoming fluid, wherein the incoming fluid enters the drum assembly through the inlet cylinder in the vicinity of the one end of the drum;
    a filter assembly mounted to or part of the inside of a portion of the container assembly, overlaying the openings in the container assembly;
    an outlet assembly;
    a trough assembly mounted fixedly to the mounting member portion, in fluid communication with the outlet assembly and having a seal contacting an interior surface of the filter assembly in a fluid tight manner;
    a manifold mounted to the frame and fixed in position, having a sealing edge for contacting an exterior surface of the container assembly in a substantially fluid tight manner; and
    a source of pressurized fluid connected to the manifold, wherein, as the container assembly turns in operation, retentate is collected on the interior surface of the filter assembly as the permeate moves through the filter and container assembly and out of the apparatus, the collected retentate being dislodged from the filter, moving into the trough assembly and from there into the central cylinder by periodic bursts of pressurized fluid, when the openings in the container assembly come into fluid connection with the manifold.

2. The filter apparatus of claim 1, including a housing assembly in which the container assembly is positioned, wherein the permeate moves from the container assembly into the interior of the housing assembly, the housing assembly further including an exit line therefrom for the permeate.

3. The filter apparatus of claim 1, including a programmed controller for controlling the operation of the apparatus.

4. The filter apparatus of claim 1, wherein the inlet assembly includes a pump which delivers fluid into the container assembly under pressure, the interior of the container thus being pressurized, except for a volume defined by the trough assembly, which is not pressurized.

5. The filter apparatus of claim 4, wherein the pressure within the container is within the range of 0-100 psi.

6. The filter apparatus of claim 5, wherein the pressure is 10-20 psi.

7. The filter apparatus of claim 1, wherein the trough assembly is in communication with the interior of the central cylinder, and wherein the central cylinder extends out of the container assembly, so that material which moves into the trough assembly and then into the central cylinder moves out of the apparatus for disposal/recovery thereof.

8. The filter apparatus of claim 1, including cylindrical sections which extend outwardly from the respective end portions thereof, defining openings through the end portions into the interior of the drum assembly, and wherein the apparatus further includes a substantially fluid-tight seal and a bearing between the cylindrical sections, respectively, and the inlet cylinder at the top end portion and the central cylinder at the bottom end portion of the drum assembly.

9. The filter apparatus of claim 7, wherein the trough assembly includes a box-like member which extends from the outlet assembly and is in communication therewith, a seal support member and a seal therein which extends around an upper edge of the box assembly, the seal being in physical contact with a surface of the filter assembly, and spring members arranged and mounted so as to bias the trough assembly seal against the filter surface.

10. The filter apparatus of claim 1, wherein the incoming liquid is waste water from laundries and the retentate is primarily lint.

11. The filter apparatus of claim 1, wherein the manifold is a box-like member with a seal around a free edge thereof which is arranged to contact the exterior surface of the container in a substantially fluid-tight manner, and wherein the manifold box member is configured to cover at least one column of the openings in the container, and wherein the box member includes means for receiving pressurized fluid from an external source thereof.

12. The filter apparatus of claim 11, wherein the pressurized fluid is air, water or steam.

13. The filter apparatus of claim 1, wherein the filter assembly includes an inner layer of perforated metal, a fine mesh layer, a coarse mesh layer and at least one extra coarse mesh layer.

14. The filter apparatus of claim 13, wherein the fine mesh layer has openings on the order of 2 microns, and wherein the coarse mesh layer and the extra coarse mesh layer are several times coarser than the fine mesh layer.

15. The filter apparatus of claim 13, including a plurality of spaced rubber strips which extend the length of the filter assembly and in the vicinity of the ends of the filter assembly and impregnate the fine, coarse and extra coarse layers, providing a substantially fluid-tight seal between adjacent rubber strips and the interior surface of the container assembly.

16. A filter apparatus for an incoming fluid having a retentate and a permeate, comprising:
a support frame;
a container assembly for incoming fluid mounted for rotation by the support frame and having openings therethrough, wherein the container assembly is a drum configured assembly, the drum configured assembly including two opposing end portions and an intermediate portion, wherein the intermediate portion includes a plurality of openings therein arranged into a pattern of rows and columns, the column openings extending between the end portions and the rows extending around the periphery thereof at spaced intervals;
an inlet assembly for delivering the incoming fluid to the container assembly, wherein the filter apparatus further includes a central cylinder which extends through the container assembly and around which the drum assembly rotates, and wherein the inlet assembly includes an inlet cylinder which surrounds and is slightly larger than the central cylinder, wherein the inlet cylinder extends through a top end portion of the drum assembly, the inlet assembly further including a connecting line for receiving the incoming fluid, wherein the incoming fluid enters the drum between the inlet cylinder and the central cylinder in the vicinity of the top end of the drum;
a filter assembly mounted to or part of the inside of a portion of the container assembly;
an outlet assembly;
a trough assembly mounted in fluid communication with the outlet assembly and having a sealing surface contacting the interior surface of the filter assembly;
a manifold having a sealing surface for contacting an exterior surface of the container assembly; and
a source of pressurized fluid connected to the manifold, wherein, as the container assembly turns in operation, retentate is collected on the interior surface of the filter assembly as the permeate moves through the filter and container assembly and out of the apparatus, the collected retentate being dislodged from the filter, moving into the trough assembly and from there into the outlet assembly by periodic bursts of pressurized fluid.

17. The filter apparatus of claim 16, wherein the trough assembly is in communication with the interior of the central cylinder, and wherein the central cylinder extends out of the housing, so that material which moves into the trough assembly and then into the central cylinder moves out of the apparatus for disposal/recovery thereof.

18. The filter apparatus of claim 16, including cylindrical sections which extend outwardly from their respective end portions thereof, defining openings through the end portions into the interior of the drum assembly, wherein the apparatus further includes a substantially fluid-tight seal and a bearing between the cylindrical sections, respectively, and the inlet cylinder at the top end portion and the central cylinder at the bottom end portion of the drum assembly.

19. A filter apparatus for an incoming fluid having a retentate and a permeate, comprising:
a support frame;
a container assembly for incoming fluid mounted for rotation by the support frame and having openings therethrough;
an inlet assembly for delivering incoming fluid to the container assembly;
a filter assembly mounted to or part of the inside of a portion of the container assembly, wherein the filter assembly includes a sealing surface which the sealing surface of the trough assembly contacts and further includes an active filter layer which is protected from wear by the sealing surface of the filter assembly and wherein the filter assembly includes an inner layer of perforated metal, a fine mesh layer, a coarse mesh layer and at least one extra-coarse mesh layer;
a plurality of spaced rubber strips which extend along the length of the filter assembly and in the vicinity of the ends of the filter assembly and which impregnate the fine, coarse and extra course layers, providing a substantially fluid-tight seal between the perforated metal layer and the interior surface of the container assembly;

an outlet assembly;

a trough assembly mounted in fluid communication with the outlet assembly and having a sealing surface contacting an interior surface of the filter assembly;

a manifold having a sealing surface for contacting an exterior surface of the container assembly; and a source of pressurized fluid connected to the manifold, wherein, as the container assembly turns in operation, retentate is collected on the interior surface of the filter assembly as the permeate moves through the filter and container assembly and out of the apparatus, the collected retentate being dislodged from the filter, moving into the trough assembly and from there into the outlet assembly by periodic bursts of pressurized fluid.

* * * * *